C. F. MEHL, H. B. LIEBLER, J. NALL & E. J. NOBBE.
SAFETY DEVICE FOR MOVING PICTURE MACHINES.
APPLICATION FILED APR. 15, 1914.
1,167,583.
Patented Jan. 11, 1916.
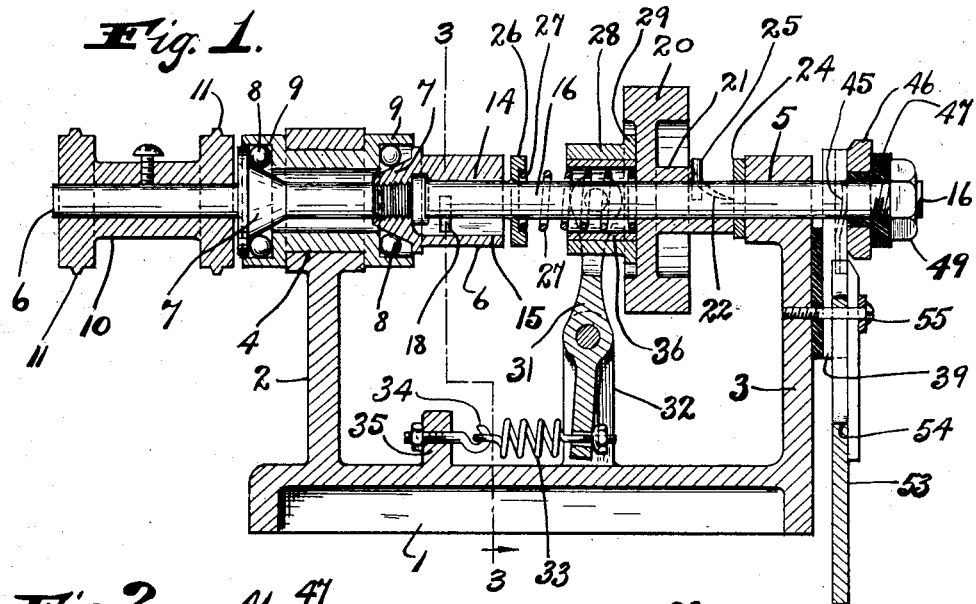
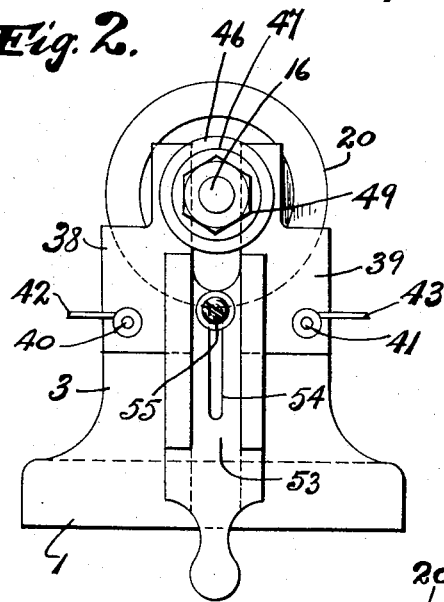
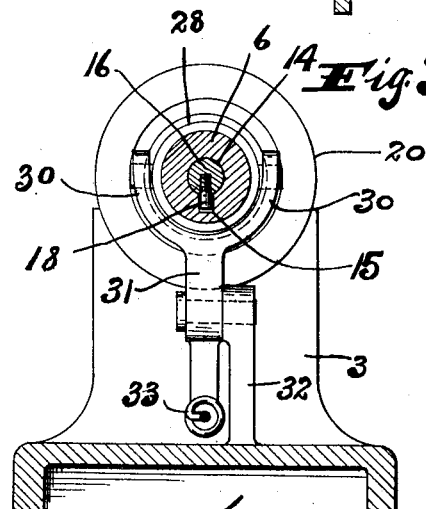
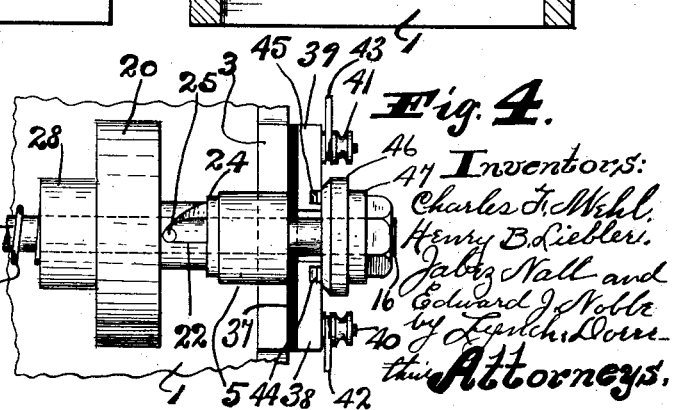

UNITED STATES PATENT OFFICE.

CHARLES F. MEHL, HENRY B. LIEBLER, JABEZ NALL, AND EDWARD J. NOBBE, OF CLEVELAND, OHIO.

SAFETY DEVICE FOR MOVING-PICTURE MACHINES.

1,167,583. Specification of Letters Patent. Patented Jan. 11, 1916.

Application filed April 15, 1914. Serial No. 831,967.

*To all whom it may concern:*

Be it known that we, CHARLES F. MEHL, HENRY B. LIEBLER, JABEZ NALL, and EDWARD J. NOBBE, citizens of the United States of America, residing at Cleveland, in the county of Cuyahoga, State of Ohio, have invented a certain new and useful Improvement in Safety Devices for Moving-Picture Machines; and we do hereby declare the following to be a full, clear, and exact description of the invention, such as will enable others skilled in the art to which it pertains to make and use the same.

This invention relates to new and useful improvements in safety devices for moving picture machines.

As is well known to those familiar with the art to which our invention relates the principal danger in operating a moving picture machine is due to the film snapping or breaking or the machine stopping, and when this occurs the film remains stationary in front of the light and the heat from the light immediately causes the film to burst into flame.

The object of this invention therefore is to provide a device which will be instrumental in cutting off the current from an electric light used in connection with a moving picture machine in case the film snaps or breaks during the operation of the machine, or if for any reason the film ceases to be driven at its normal rate, in order to prevent the film from being set on fire by the light.

Our invention therefore consists in providing a device adapted to be directly driven or actuated by the film carried by the moving picture machine and having such an arrangement of parts that the breaking of the film will stop the movement of the device and result in disconnecting the electric current from the light used in connection with the film.

More particularly speaking our invention consists in providing a device comprising a drum which is provided with pins adapted to engage with the series of perforations which extend longitudinally at each side of a film in a moving picture machine. This drum is connected with a rotatable member which actuates a slidable member, the position of which is governed by the rotation or non-rotation of the said rotatable member. Electric terminals are arranged in proximity to the slidable member so that the said member will either open or close the circuit of which the said terminals form a part according to the position it occupies.

Our invention also consists in the features of construction and combination of parts hereinafter described in the specification, pointed out in the claims and illustrated in the accompanying drawings.

Referring particularly to the drawings, Figure 1 is a central longitudinal section through a device embodying our invention. Fig. 2 is an end view of the same. Fig. 3 is a section on line 3—3, Fig. 1. Fig. 4 is a detail view in top plan.

Again referring to the drawings, 1 represents the base of our device, and 2 and 3 represent standards arranged thereon. On the upper end of the said standards 2 and 3 are formed bearings 4 and 5. In the bearing 4 is mounted a shaft 6, which, as shown, is formed in two sections which are screwed together. The said shaft 6 is preferably provided with cone-shaped bearing members 7 which coöperate with balls 8 mounted in the sleeve 9 forming a part of the said bearing 4. On the outer end of the shaft 6 is rigidly secured a drum 10. At each end the said drum 10 is provided with a series of pins or projections 11 which are spaced circumferentially of the drum and the same distance apart as the perforations, which extend longitudinally at each side of a film such as is now used in the ordinary moving picture machine. In the opposite end of the shaft 6 is formed a longitudinal bore 14 and in the wall of said bore is formed a slot or key-way 15. A shaft 16 has one end extending into and freely slidable in the said bore 14 and the other end of said shaft 16 is rotatably and slidably mounted in the bearing 5 so that the end thereof projects beyond said bearing 5. A pin 18 is secured in the shaft 16 where it extends into the bore 14 and the outer end of said pin extends into the key-way 15 so that the said shaft 16 is connected to the shaft 6 so as to rotate therewith while being free to move longitudinally independently of the shaft 6. On the said shaft 16 is loosely mounted a member 20 which is in the form of a balance wheel, and the said wheel carries a hub 21 in which is formed a cam slot 22. The end of the hub 21 is arranged to bear against the vertical face of the bearing 5 and a washer 24 is preferably arranged between the end of the hub and the said bearing. A pin 25 is secured in the shaft 16 so as to extend into the said cam slot 22. On the shaft 16 is secured a collar 26 and on the said shaft 16 between said collar 26 and the member 20 is arranged a coil spring 27, and as the said member 20 is held against movement owing to the hub thereof abutting against the standard 5 the tendency of the said spring 27 is to resiliently resist the outward longitudinal movement of the shaft 16 and to return the shaft 16 into its inward position after it has been moved outwardly. On the said shaft 16 outside of the spring 27 is mounted a friction member 28 which is in the form of a cylinder and has a flange 29 adapted to abut against the web of the member 20. This friction member 28 is supported between the forked ends 30 of a lever 31 which is pivotally mounted intermediately of its upper and lower ends on a standard 32, which said standard is mounted on the base 1. To the lower end of the lever 31 is secured one end of a coil spring 33, and the other end of said spring is secured to a hook 34 supported on a lug 35 on the said base 1. The spring 33 is arranged to draw the lower end of the lever toward the lug 35 and cause the upper end of the lever to hold the friction member 28 against the member 20. A sleeve 36 is preferably arranged between the coil spring 27 and the said friction member 28.

On the outer face of the standard 3 are mounted two terminal forming plates 38 and 39 which carry binding posts 40 and 41 for the ends of wires 42 and 43 which form part of an electric circuit which includes a suitably operated switch (not shown) for controlling the current to the electric light. The said plates 38 and 39 are insulated from the standard 3 by insulating material 37, and said plates extend up at each side of the end of the shaft 16 and are preferably provided with spring contact blades or tongues 44 and 45. On the outer end of the shaft 16 is secured a circuit closer 46 which is preferably in the form of a disk which, in the inward position of the shaft 16, is arranged to engage with and bridge the ends of the terminal plates 38 and 39 and thereby close the circuit of which said plates form the terminals. The said disk 46 is insulated from the shaft 16 by suitable insulating material, shown at 47, and is held on the end of said shaft by means of a nut 49.

When the moving picture machine is not in operation the various parts of our device will be in the position shown in Fig. 1; that is, the disk 46 will be in contact with the terminal plates 38 and 39, and therefore no current will be furnished the electric light, as will appear more fully later. Now, in order to provide a temporary means for holding the disk 46 away from the terminal plates 38 and 39 during the preliminary arrangement of the machine when it is necessary to have current supplied to the light, we provide a spacing member which comprises a plate 53 of any suitable non-conducting material. In the said plate 53 is formed a slot 54, and a screw 55 extends through the slot and into the standard 3 so that the said plate 53 is supported so that it can slide vertically, and said plate in its upper position is adapted to extend between the terminal plates 38 and 39 and the disk 46 on the end of the shaft 16 and hold said disk 46 out of contact with the said terminal plates 38 and 39.

The operation of the device is as follows:—The device is mounted so that the film which is to be exhibited will pass over or around the drum 10 and in engagement with the projections 11. Now when the moving picture machine is started the drum 10 will be driven, which in turn drives the shaft 6 and it in turn drives the shaft 16. Now as the member 20 is resiliently held against movement by the friction member 28 the said member 20 will not start at the same time the shaft 16 starts and the pin 25 on the said shaft 16 will therefore ride outwardly in the cam slot 22 in the hub 21 of the said member 20 until its outward movement is arrested by coming in contact with the bearing 5, after which the pin 25 will pick up the member 20 and carry it around with the said shaft 16. Now, as the pin 25 moved out in the cam slot the shaft 16 was caused to move out longitudinally in its bearing, and as the shaft 16 moved out it carried the disk 46 away from the contact plates 38 and 39, and as long as the said shaft 16 remains in its outer position the disk 46 is held away from the terminal plates 38 and 39 and therefore the electric circuit of which the said plates 38 and 39 form the terminals remains open. Now in case the film breaks or the machine stops or for any reason the film stops moving, the drum 10 will no longer be driven and therefore the shafts 6 and 16 will cease to rotate. As soon as the shaft 16 ceases to rotate the spring 27 will cause the shaft 16 to move backward longitudinally in its bearings and the disk 46 on the end of said shaft will be brought against the terminal plates 38 and 39 thereby closing the electric circuit which governs the switch-operating device which pulls the switch and cuts off the current from the light.

What we claim is,—

1. In a device of the character described, the combination with a moving picture machine of a frame, a driving shaft journaled in said frame, a drum mounted on one end of said shaft, said drum being provided with projections adapted to engage with the perforations of the film of the moving picture machine, a longitudinally shiftable shaft journaled in line with said driving shaft, means forming an operative connection between the driving shaft and said longitudinally shiftable shaft so that said driving shaft will rotate said longitudinally shiftable shaft while leaving it free to move longitudinally, a spring arranged to resist the longitudinal movement of said longitudinally shiftable shaft, a cam carrying member rotatably mounted on said longitudinally shiftable shaft, a pin carried by said longitudinally shiftable shaft and arranged to engage with the cam surface on the cam carrying member, terminals arranged in proximity to said longitudinally shiftable shaft and a circuit closer carried by said longitudinally shiftable shaft and adapted to make contact with said terminals in the inward position of said longitudinally shiftable shaft.

2. In a device of the character described, the combination with a moving picture machine of a frame, a driving shaft journaled in said frame, said shaft having a socket in one end thereof and said socket having a key-way in the wall thereof, a drum journaled on the other end of said shaft, said drum being provided with projections adapted to engage with the perforations in the film of the moving picture machine, a longitudinally shiftable shaft journaled in line with said first mentioned shaft and having one end extending into the socket in the driving shaft, a pin secured in the end of said longitudinally shiftable shaft where it extends into the said socket, said pin being arranged to extend into the key-way in the wall of the said socket, a member mounted on said longitudinally shiftable shaft and free to rotate thereon, said member being provided with a cam surface, a pin secured in said longitudinally shiftable shaft and adapted to engage with the cam surface on said member, a spring arranged on said longitudinally shiftable shaft and adapted to resist the longitudinal movement thereof and return said shaft to its original position after it has been moved longitudinally, a lever mounted on said frame, a friction member mounted at the upper end of said lever, a spring having one end secured to said frame and the other end to the lower end of said lever and arranged to cause the lever to yieldingly hold the friction member against the cam carrying member, terminal plates mounted in proximity to the end of said longitudinally shiftable shaft and a circuit closer carried by said longitudinally shiftable shaft and arranged to make contact with said terminal plates in the inward position of said longitudinally shiftable shaft.

3. In a device of the character described, the combination with a moving picture machine of a base, a pair of standards mounted on said base, a driving shaft journaled in one of said standards, a drum secured on one end of said shaft, a second shaft journaled in line with said driving shaft and operatively connected with the driving shaft so as to rotate therewith, while being free to slide longitudinally, a member mounted on the said longitudinally shiftable shaft and free to rotate thereon, said member being provided with a cam surface, a pin secured in said longitudinally shiftable shaft and adapted to engage with the cam surface on the cam carrying member, a spring arranged on said longitudinally shiftable shaft and adapted to yieldingly resist the longitudinal movement of said shaft and return said shaft to its original position after the shaft has been moved longitudinally, a lever mounted on said base, a friction member mounted on said lever and arranged to engage with said cam carrying member, a spring having one end secured to said base and the other end secured to said lever and adapted to cause the lever to yieldingly hold the friction member against the cam carrying member, terminal plates mounted in proximity to the end of said longitudinally shiftable shaft and a circuit closer carried by said longitudinally shiftable shaft and adapted to make contact with said terminal plates in the inward position of said shaft.

4. In a device of the character described, the combination with a moving picture machine of a drum arranged to be driven directly by the film of the moving picture machine, a shaft operatively connected with said drum and arranged to be rotated by said drum while being free to move longitudinally, means for resiliently resisting the longitudinal movement of said shaft, means for producing a longitudinal movement of said shaft when the said drum is driven, terminal plates mounted adjacent to the end of said shaft, a contact member carried by said shaft and adapted to engage said terminal plates, and a spacer plate adapted to be inserted between said terminal plates and the said contact member so as to be held therein when the said drum is not driven.

In testimony whereof, we sign the foregoing specification, in the presence of two witnesses.

CHARLES F. MEHL.
HENRY B. LIEBLER.
JABEZ NALL.
EDWARD J. NOBBE.

Witnesses:
B. C. BROWN,
HERBERT C. WOOD.

Copies of this patent may be obtained for five cents each, by addressing the "Commissioner of Patents, Washington, D. C."